United States Patent [19]

Gerritsen

[11] 4,441,120

[45] Apr. 3, 1984

[54] DEVICE FOR MEASURING AND METHODS FOR ADJUSTING THE CONVERGENCE OF THE ELECTRON BEAMS IN COLOR DISPLAY TUBES

[75] Inventor: Jan Gerritsen, Eindhoven, Netherlands

[73] Assignee: U.S. Philips Corporation, New York, N.Y.

[21] Appl. No.: 141,515

[22] Filed: Apr. 18, 1980

[30] Foreign Application Priority Data

May 3, 1979 [NL] Netherlands .................. 7903468

[51] Int. Cl.$^3$ ............................................ H04N 9/62
[52] U.S. Cl. .................................... 358/10; 358/139
[58] Field of Search ................ 358/10, 139; 315/368, 315/13 C

[56] References Cited

U.S. PATENT DOCUMENTS

| | | | |
|---|---|---|---|
| 3,984,862 | 10/1976 | Volz | 358/10 |
| 4,193,086 | 3/1980 | Kawaguchi | 358/10 |
| 4,201,932 | 5/1980 | Smith | 358/10 |
| 4,223,350 | 9/1980 | Movtet | 358/10 |

FOREIGN PATENT DOCUMENTS

| | | | |
|---|---|---|---|
| 52-50123 | 4/1977 | Japan | 358/10 |
| 54-104231 | 8/1979 | Japan | 358/10 |
| 54-104232 | 8/1979 | Japan | 358/10 |

*Primary Examiner*—Michael A. Masinick
*Attorney, Agent, or Firm*—Thomas A. Briody; William J. Streeter

[57] ABSTRACT

A device for and methods of measuring and adjusting the convergence of the electron beams in a color display tube of the shadow mask type.

The device includes a detector in the form of a divided photosensitive cell comprising at least two separate photosensitive surface parts which are situated symmetrically relative to the center of the cell. The photosensitivity of the surface parts increases substantially from the center of the cell.

In use the device is mounted so that the detector is on the central area of the display screen. Three lines are produced in one deflection direction of the tube by means of the three electron beams with one video signal. The central line and detector are moved relative to each other until the longitudinal axis of the line coincides with the center of the cell. Then either the distances from the axes of the other two lines to the axis of the center line are measured by determining the differences of the incident light impinging on the two separate surface parts and the measurements are stored for subsequent use or the static convergence unit of the tube is adjusted until all three lines coincide.

The method is repeated for three lines extending in the other deflection direction.

10 Claims, 23 Drawing Figures

DEVICE FOR MEASURING AND METHODS FOR ADJUSTING THE CONVERGENCE OF THE ELECTRON BEAMS IN COLOR DISPLAY TUBES

The invention relates to a device for measuring the convergence of the electron beams in a colour display tube of the type having a colour selection electrode.

The invention also relates to two methods of measuring and adjusting the static convergence unit of a colour display tube of the type having a colour selection electrode by means of such a device.

BACKGROUND OF THE INVENTION

Colour display tubes of the type having a colour selection electrode are composed inter alia of an evacuated glass envelope consisting of a display window, a cone and a neck. A display screen composed of a large number of luminescent elements is provided on the inside of the display window. Means, for example, three electron guns, to generate three electron beams are provided opposite to the display screen in the neck of the colour display tube. In tubes of the so-called "delta" type, the three electron guns are arranged on a cone envelope according to an equilateral triangle. In tubes of the "in-line" type the axes of the three electron guns are located in one plane and the axes enclose a small angle with each other. Immediately before the display screen a colour selection electrode is provided which usually consists of a metal sheet having a large number of rows of apertures. Such a colour selection electrode is sometimes termed a shadow mask. A triplet of three luminescent elements, one red, one green and one blue luminescent element, is present behind each aperture. In tubes of the "delta" type the triplets usually consist of three phosphor dots situated at the corners of an equilateral triangle, and in tubes of the "in-line" type they usually consist of a large number of parallel phosphor stripes. Since the axes of the electron guns and hence the electron beams enclose a small angle with each other, each electron beam, considered purely theoretically, impinges only on phosphor elements of one color. In practice, however, it has been found that, as a result of tolerances in the manufacture of the colour display tubes and the deflection coils, each of the electron beams often does not impinge only on phosphor regions of one colour. In that case the colour purity of the tube is not correct. Often the convergence is also insufficient, in other words, the partial images in the three basic colours written on the display screen by the three electron guns do not coincide entirely. In many cases it has proved necessary during the manufacture of colour television sets to perform corrections so as to obtain a colour pure image and an image having a good convergence.

The colour purity and the convergence on the central part of the display screen (the so-called static convergence) are adjusted by means of a multipole unit which is arranged around or in the neck of the display tube behind the unit of deflection coils. Such colour purity units and static convergence units are described in detail inter alia in the Netherlands Patent Application No. 7707476 laid open to public inspection, and they may consist of a large number of magnetic rings which together constitute a multipole or they may consist of one ring magnetized as a multipole. The convergence on the remaining part of the display screen is termed the dynamic convergence. As a matter of fact, the electron beams must always remain converging also during the deflection over the display screen. This dynamic convergence is obtained by means of extra deflection currents through the system of deflection coils or by means of automatically converging deflection coils as described in detail in the Netherlands Pat. No. 110569. The measurement of the colour purity and the convergence has so far been carried out manually usually by means of a measuring microscope with which a raster of lines displayed on the display screen were examined. This method has a number of disadvantages and therefore other solutions were tried. One of the solutions was a device of the kind mentioned in the opening paragraph which is disclosed in the British Patent Specification No. 1,220,900. In this device the measuring microscope has been replaced by a detector which is placed against the display window and which observes a part of the display screen and which measures the colour purity. However, this device does not permit the performance of convergence measurements.

It is therefore an object of the invention to provide a device with which both the static and dynamic convergence can be measured accurately during the manufacture of colour display tubes and deflection coils.

Another object of the invention is to provide two methods for adjusting the static convergence unit of a colour display tube of the shadow-mask type by means of such a device.

A further object of the invention is to provide a device and methods which are particularly suitable for automation.

SUMMARY OF THE INVENTION

For that purpose, a device according to the invention is characterized in that the device comprises a detector having at least one photosensitive cell which is composed of at least two separate photosensitive surface parts that are situated symmetrically with respect to the centre of the cell. The detector comprises optical elements for displaying a part of the display screen on the photosensitive surface parts of the photosensitive cell. The photosensitivity of the photosensitive surface parts increasing substantially from the centre of the cell. The detector comprises moreover means to establish the difference in the amount of light on the photosensitive surface parts.

Such a device permits the very accurate performance of both measurements of static and dynamic convergence and then performance of the corrections which are required with reference to the measurements. The great advantage of this device is that the structure of the colour selection electrode has substantially no influence on the measurement.

The photosensitive cell of the detector preferably comprises four separate photosensitive surface parts which become wider from the centre. For example, in the case of a square cell the diagonals of the square constitute the lines of separation between the four photosensitive surface parts of the cell.

A further preferred embodiment of the device is characterized in that the optical elements of the detector comprise a colour separation prism system or mirror device behind which three photosensitive cells are provided so that a part of the display screen is displayed on these three cells and, viewed from the display screen, the centres of the photosensitive cells apparently coincide.

According to another aspect of the invention, there is provided a first method of adjusting the static convergence unit of a colour display tube, comprising the steps of displaying a first line on the display screen by means of a video signal and one of the electron beams, which line extends in one of the deflection directions and over the central part of the display screen, placing the detector of the device opposite to said central part of the display screen so that the photosensitivity of two of the photosensitive surface parts mainly increases substantially perpendicularly or perpendicularly to the longitudinal direction of the line from the centre of the measuring cell, moving said line relative to the detector in such a manner that the two photosensitive parts observe the same amount of light, thereby indicating that the longitudinal axis of the line is displayed on the centre of the photosensitive cell, adjusting the static convergence unit so that two other lines which are parallel to the first line and which are obtained by means of the same video signal and the other electron beams until the two parts of the photosensitive cell observe the same amount of light, thereby indicating that the longitudinal axes of these two other lines are also displayed on the centre of the photosensitive cell, and repeating the above mentioned steps for lines extending in the other deflection direction. In this method the device is used as a zero detector. All lines are centred on the centre of the photo cell or photo cells.

According to the invention, a second method of adjusting the static convergence unit of a colour display tube, comprises the steps of displaying three lines simultaneously or successively on the display screen by means of one video signal and the electron beams, which lines extend in one of the deflection directions over the central part of the display screen, disposing the detector of the device opposite to the central part of the display screen so that the photosensitivity of two of the photosensitive surface parts mainly increases substantially perpendicularly or perpendicularly to the longitudinal direction of the lines from the centre of the photosensitive cell, measuring the location of the three lines relative to each other by means of the detector which measures per line the difference in the amount of light on the said parts, which measured values constitute a measure of the values to be adjusted of the static convergence unit, repeating the above steps for the three electron beams with lines extending in the other direction of deflection, and adjusting the convergence unit by an amount dependent on the resulting measured values.

In this method the device is used as a measuring device for the convergence error. One of the lines is preferably centred on one of the photosensitive cells before the location of the lines is measured.

A first preferred embodiment of these two methods is characterized in that the three parallel lines are displayed simultaneously on the display screen and the optical means of the detector comprise a colour separation prism system so that the lines are each displayed on one separate photosensitive cell the centres of which, viewed from the display screen, apparently coincide.

Upon using the methods according to the invention it was found to be difficult to keep the first line centred on the photosensitive cell. Therefore, in a second preferred embodiment of the methods according to the invention the first line is kept centred on the photosensitive cell by coupling back the signal of the photosensitive cell, after amplification, by superposition of a direct current on the deflection currents or by a shift in the video signal. A shift in the video signal can be obtained in a very simple manner by a shift of the synchronization pulses.

The width of the lines is preferably about four times the horizontal pitch of the rows of apertures in the colour selection electrode. The line width can very readily be adjusted by means of a low pass filter in the video signal line.

A last preferred embodiment of the methods according to the invention is characterized in that the static convergence unit is a magnetizable ring in the neck of the envelope of the colour display tube which is magnetized in known manner as a multipole dependent on the measured values. This method permits a fully automatic adjustment of the static convergence.

BRIEF DESCRIPTION OF THE DRAWINGS

The invention will now be described in greater detail, by way of example, with reference to the drawings in which.

DESCRIPTION OF THE PREFERRED EMBODIMENTS

Figure 1:
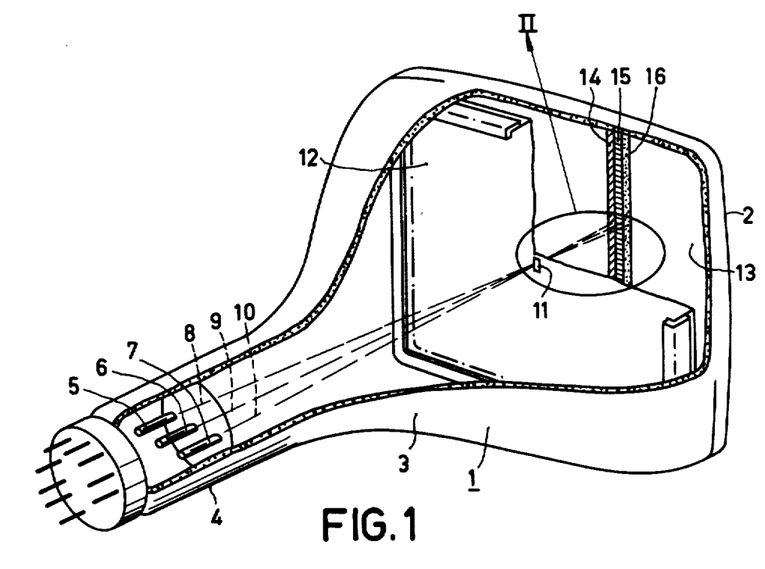
FIG. 1 is a perspective view, partly broken away, of a colour display tube of the "inline" type.
Figure 2:
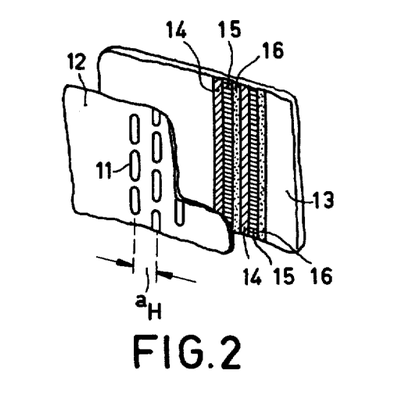
FIG. 2 shows a section of FIG. 1.

FIG. 1 is a perspective view, partly broken away, of a colour display tube of the "in-line" type. The tube is composed of a glass envelope 1 consisting of a display window 2, a cone 3 and a neck 4. Three electron guns 5, 6 and 7 situated in one plane in the neck generate three electron beams 8, 9 and 10. These electron beams enclose a small angle with each other, the so-called colour selection angle, and pass through the apertures 11 in the colour selection electrode 12 which is placed before the display window 2. The display screen 13 which consists of a large number of triplets 14, 15 and 16 is present on the inside of the display window. The rows of apertures 11 in the colour selection electrode are parallel to the phosphor stripes as is visible in FIG. 2. Since the electron beams enclose a small angle with each other, electron beam 10, when the tube is readily adjusted, impinges only on phosphor stripes 14 of a red luminescing phosphor, electron beam 9 impinges only on phosphor strips 15 of a green luminescing phosphor and electron beam 8 impinges only on phosphor lines 16 of a blue luminescing phosphor.

Figure 3:
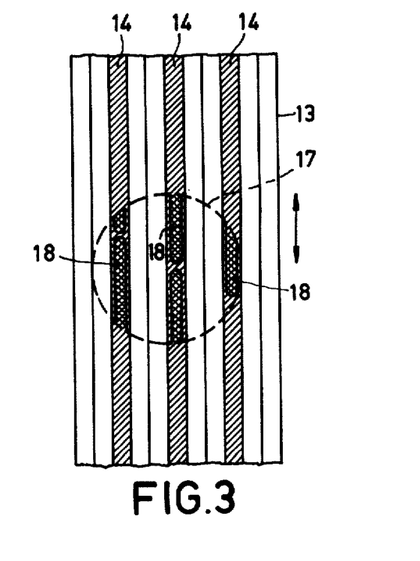
FIG. 3 shows the microscopic structure of a spot on the display screen.
Figure 4:
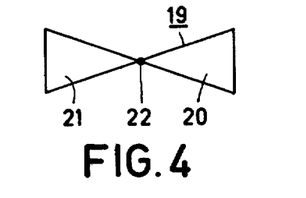
FIGS. 4, 5 and 6 are elevations of a number of photosensitive cells.

FIG. 3 shows a spot 17 of electron beam 10 on the display screen 13. The spot has a diameter of 2 to 3 mm and the phosphor stripes are approximately 270 μm wide. The apertures 11 in the colour selection electrode are disposed on the phosphor stripes by the electron beam. As a result of this the spot has a microscopic structure consisting of the displays 18. In colour display tubes, the pictures displayed by the three electron beams in the three basic colours must coincide accurately throughout the display screen, in other words, the three electron beams must converge throughout the display screen. Since the spots have a microscopic structure which is a resiult of the use of a colour selection electrode it has so far been substantially impossible to very accurately adjust the convergence because it was not possible to accurately measure the location of frames described with the electron beams. This is possible indeed by means of the device according to the invention. The gist of the invention is the use of a detector which displays a part of the display screen on a photosensitive cell. Figure 4 shows such a photosensitive cell. This photosensitive cell 19 consists of two separate photosensitive surface parts 20 and 21 which are located symmetrically with respect to the centre 22 of the cell. As will be explained hereinafter it is very important for the photosensitivity of the surface parts 20 and 21 to increase substantially from the centre 22. This increase in sensitivity can be obtained by a suitable choice of the shape of the parts. However, it is also possible to provide the parts with a filter having a transmission which decreases towards the centre of the cell.

Figure 5:
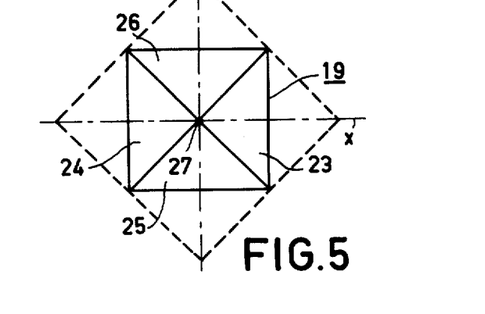

FIG. 5 shows a square photosensitive cell consisting of four surface parts 23, 24, 25 and 26 which extend from the centre 27 and the photosensitivity of which increases into mutually perpendicular directions x and y. The photosensitive cell may alternatively have a shape as is shown by the broken line. The part with which measurement can be carried out, however, is then restricted to the four surface parts 23 to 26.

Figure 6:
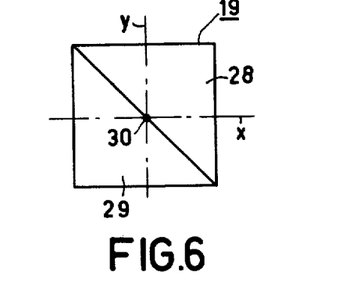

FIG. 6 shows a photosensitive cell which consists only of two surface parts 28 and 29 the photosensitivity of which also increases substantially in two mutually perpendicular directions x and y from the centre 30. However, such a cell is less sensitive than the cell shown in FIG. 5.

Figure 7:
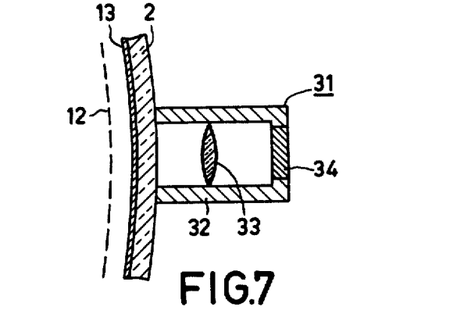
FIGS. 7 and 8 are sectional views of detectors for devices according to the invention.

FIG. 7 shows a detector 31 for a device according to the invention. This detector is composed of a housing 32 in which a lens 33 is accommodated. A part of the display screen 13 is displayed on the surface of the photosensitive cell 34 by means of said lens. The detector is placed against the display window 1 on its outside. This detector permits of successively displaying partial pictures in the three basic colours on the photosensitive cell.

Figure 8:
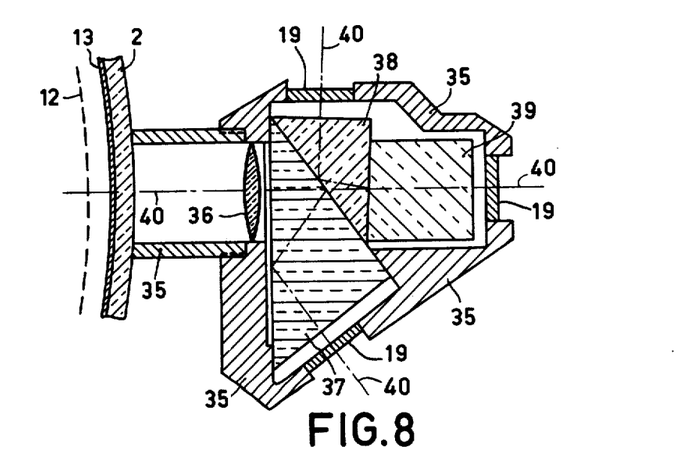
Figure 9:
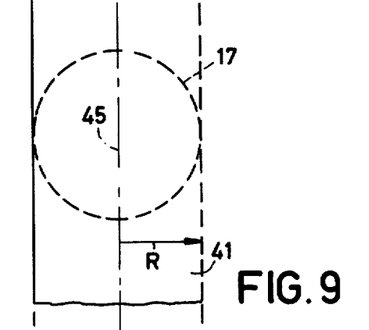
FIGS. 9 to 14 further explain the operation of the photosensitive cell.
Figure 10:
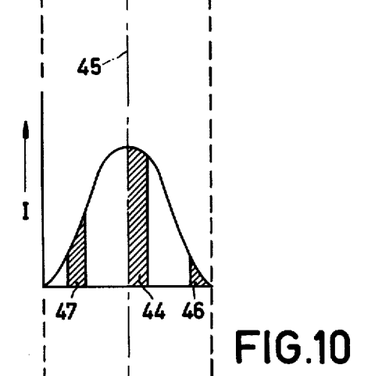
Figure 11:
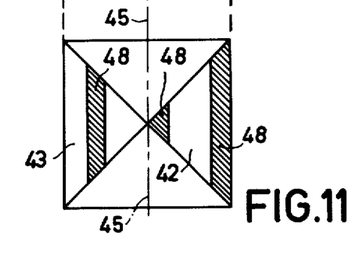

FIG. 8 shows a detector with which it is possible to separate the picture on a display screen in the three basic colours and to simultaneously reproduce it on three photosensitve cells. The detector is placed against the display window 2. The holder 35 comprises a lens 36 and a colour separating prism system consisting of three prisms 37, 38 and 39 which are connected together with optically flat facettes having interference filters. The variation of the axes 40 denotes the splitting of the light. Such colour separating prism systems are known from television camera technology. It is also possible, instead of a prism system, to use a colour separating system with mirrors and filters, which colour separating systems are also known from television camera technology. The detector comprises in addition three photosensitive cells 19 of a shape as shown in FIGS. 4, 5 or 6. The photosensitive cells are placed in the holder so that, viewed from the display window, their centres apparently coincide.

Figure 12:
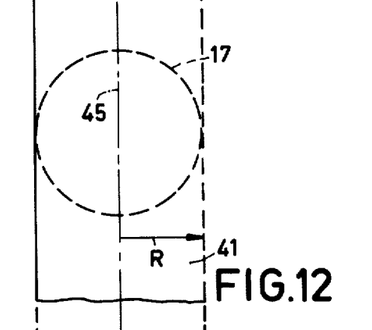
Figure 13:
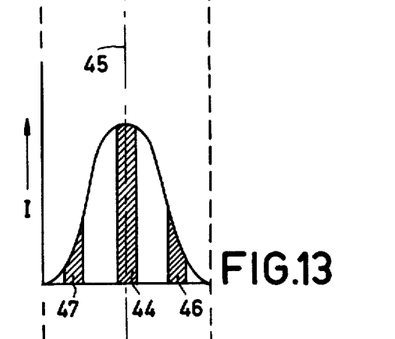
Figure 14:
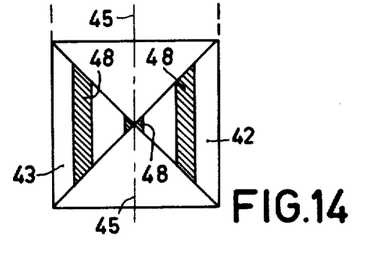

The operation of the described device will now be described in greater detail with reference to FIGS. 9 to 14. As already noted, the electron beams in a colour television display tube converge when the spots accurately coincide on the whole display screen. The mutual position of the spots on the display screen could be measured in several manners. Four photocells placed in a quadrant would have to be used in which the spots could be centred on the crossing of the four diodes by comparing the signals of the photodiodes with one another. A principle difficulty, however, is constituted by the structure of the colour selection electrode and the microstructure of the spot on the display screen. In current colour display tube types (20 AX and 30 AX of Philips) the distance between the centre lines of the rows of elongate apertures in the colour selection electrode, the horizontal pitch $a_H$ (see FIG. 2), is approximately 0.8 mm. This impedes the measurement of the horizontal spot position since the position of the cell relative to the display screen structure plays an important role. Only if the centre of such a cell falls exactly centrally between the projections of two phosphor lines of one colour on the photosensitive cell will the determination of the position be accurate. An asymmetric position of the photosensitive cell relative to the phosphor lines causes errors in the measurements of the location of a line displayed on the display screen up to approximately 0.3 mm and upon measuring the location of two lines of different colours relative to each other at most 0.6 mm, which is much too inaccurate. In a method according to the invention a vertical line 41 (FIG. 9) is displayed on the display screen by means of a moving spot 17. Such a line also has a microstructure as a result of the colour selection electrode. The shaded areas in FIG. 10 denote the light intensity in the various parts of the displayed line. Because the photosensitivity of the surface parts 42 and 43 of the photosensitive cell increases from the centre (see FIG. 11) the location of the axis of the line is no longer determined substantially by the large light contribution 44 near said axis 45 (see FIG. 10) but also by the light contributions 46 and 47 at the edges of the line. In other words, the photosensitive cell in the device according to the invention compensates the brightness in the line 41 which increases towards the axis. A difference in incident light is measured on the parts 42 and 43 of the photosensitive cell. This difference is an accurate measure of the location of the axis of the displayed line. In measurements with the device according to the invention, errors of only approximately 10 μm occur in spite of the horizontal mask pitch $a_H$ of approximately 0.8 mm. It has been found that the width of the line must preferably be about 4×the horizontal mask pitch so as to enable this very accurate adjustment. The shaded areas 48 in FIG. 11 denote the amounts of light incident on the cell parts 42 and 43. FIGS. 12 to 14 denote the situation when the line is centred on the photosensitive cell. Equal amounts of light are incident on the cell parts 42 and 43 in FIG. 14.

A method according to the invention will now be described in greater detail by way of example with reference to FIGS. 15 to 21. As described elaborately with reference to the preceding Figures. the device according to the invention permits of accurately determining the location of a line displayed on the display screen of a colour display tube. It is also possible to very accurately centre a reproduction of the line on the photosensitive cell. There is started from a static non-converging colour display tube.

Figure 15:
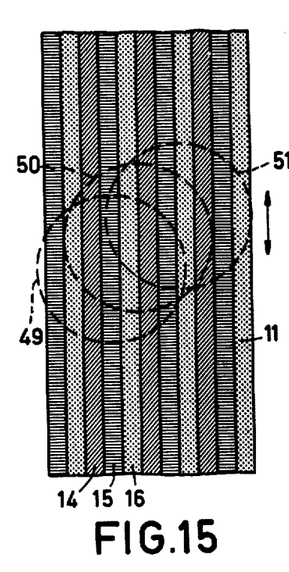
FIG. 15 shows the targets in a non-convergence colour display tube.
Figure 16:
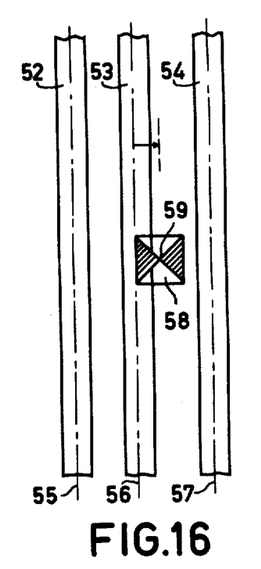
FIGS. 16 to 21 further explain a method according to the invention.

In FIG. 15, the spots 49, 50 and 51 of the three electron beams are displayed on a central part of the display screen 11 consisting of phosphor lines 14, 15 and 16. These spots do not coincide, the tube does not converge either horizontally or vertically. Vertical lines 52, 53 and 54 are displayed (simultaneously or successively) on the display screen by means of the three electron beams (FIG. 16). For clarity, the lines have been drawn wide apart. In practice they overlap each other or they are situated immediately beside each other, as follows also from FIG. 15. The axes 55, 56 and 57, like the spots 49, 50 and 51, do not coincide. The next step of the method is the accurate centering of the reproduction of axis 56 of line 53 on the centre 59 of the photosensitive cell 58 (arrow). This movement of the line 53, the centering, may be carried out by superposition of a direct current component on the horizontal deflection current or by a shift in the video signal, for example, by a shift of the synchronization pulses. It is also possible to move the detector, but this is much less convenient. During this centering and if a detector as shown in FIG. 7 is used, only the light to be centered is displayed. When the detector shown in FIG. 8 is used it is possible to always display the three lines simultaneously.

Figure 17:
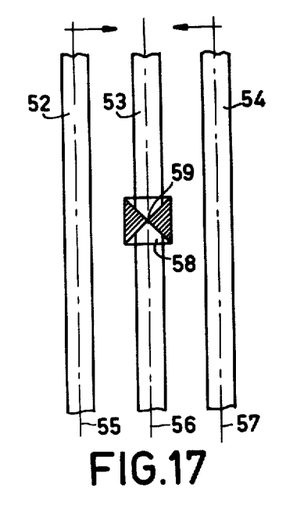

FIG. 17 shows the centred line 53 displayed on the photosensitive cell 58. During said movement of line 53, the lines 52 and 54 have also been moved. By means of a multipole convergence unit, the lines 52 and 54 are displayed so as to be centered on the centre 59 of the cell 58 (in the direction of the arrows).

Figure 18:
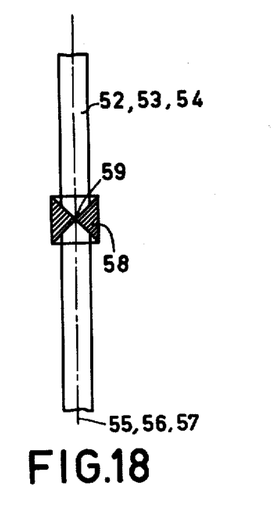

In FIG. 18 the three lines 52, 53, 54 converge accurately. The tube converges horizontally.

Figure 19:
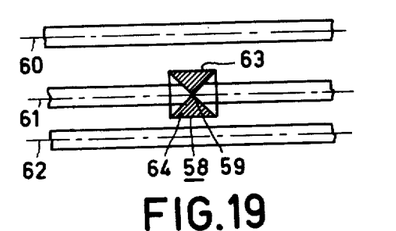
Figure 20:
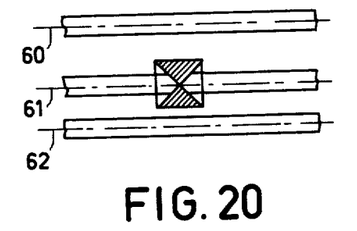
Figure 21:
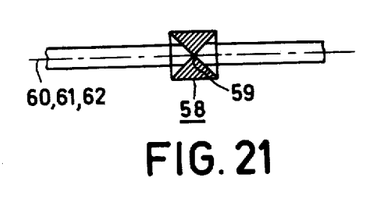

The adjustment of the vertical convergence is carried out in an analogous manner as is shown in FIGS. 19, 20 and 21. The three horizontal lines 60, 61 and 62 must coincide and be displayed with their axes on the centre 59 of the cell 58. By using a photosensitive cell as shown in FIG. 5 it is not necessary to rotate the cell 90° and the surface parts 63 and 64 may be used for centering and converging the three lines.

FIG. 21 shows the three superimposed lines displayed with their axes on the centre 59 of the photosensitive cell 58. The colour display tube now also converges vertically. The three spots 49, 50 and 51 as shown in FIG. 15 will now coincide very accurately at least in the central part. The static convergence of the colour display tube has been adjusted. In the method described the device is used as a zero detector. However, a device according to the invention also permits of very accurately measuring the error in the convergence in nonconverged situations. This is possible because the relationship between the position of the line and the signal of the photocell around the centre is substantially linear. Therefore the device according to the invention is also very suitable to measure the static and the dynamic convergence in various places on the display screen. By means of the device it can be observed whether corrections of the static and dynamic convergence have had the desired result. The device may also be used in manufacturing and adjusting deflection coils. The coils may be adjusted so that they produce the desired dynamic convergence, which is measured with the device according to the invention, of the electron beams in a sample tube.

If a line displayed on the display screen moves too much to enable an accurate measurement, said movement can be removed with a simple feedback coupling of the photosensitive cell to the deflection coils (DC-loop). The width of the line may be varied and adjusted by means of an adjustable lowpass filter in the video signal line. The line preferably has a width which is about 4× as large as the horizontal pitch of the mask.

The device and the method are particularly suitable to produce a fully automatic adjustment of the static convergence.

Figure 22:
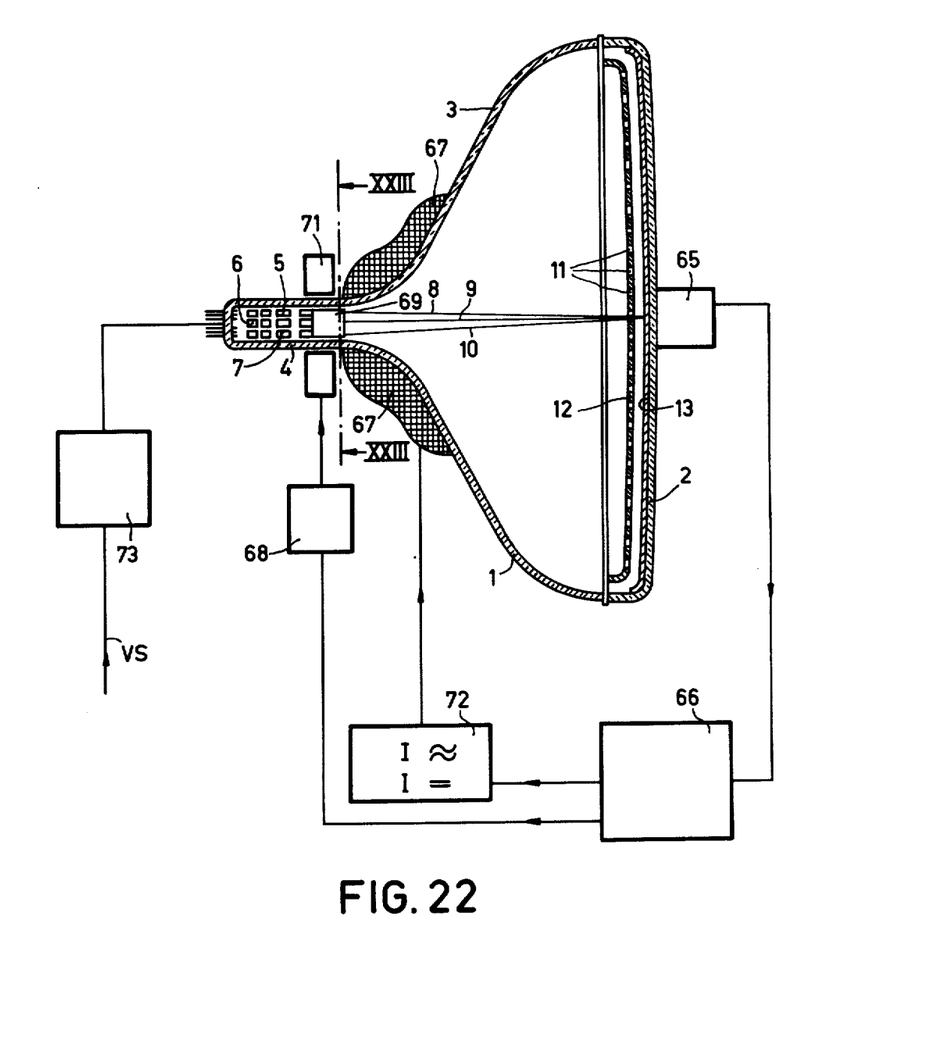
FIGS. 22 and 23 show an automated device according to the invention.

FIG. 22 shows diagrammatically the operation of a fully automatic convergence adjustment. A detector 65 is placed against the central part of the display window 13 of a colour display tube as shown in FIG. 1. The detector is composed as described above and can accurately determine the location of the horizontal and vertical lines which are displayed on the display screen by means of three electron beams 8, 9 and 10. The detector is connected to a microprocessor 66. The microprocessor 66 controls the direct current through the deflection coils 67 superimposed on the deflection currents or the shift in the video signal to centre the line obtained by electron beam 9 on the photosensitive cell. The microprocessor also energizes the unit 68 to adjust static convergence unit. The static convergence unit in this tube is a magnetizable ring 70 (see FIG. 23) which is situated at the end of the electron guns 5, 6 and 7 and is provided around the three electron beams 8, 9 and 10 in centering sleeve 69. The static convergence unit is adjusted by magnetizing the ring 70 in known manner with a magnetizing unit 71 in such manner as to maintain the desired correcting multiple magnetic field necessary for the static convergence. The method of magnetization is elaborately described in Netherlands Pat. No. 7707476 or U.S. Pat. No. 4,220,897 laid open to public inspection. The video signal (VS) to obtain the lines is applied to the control grids of the three electron guns via a lowpass filter 73, so that the lines can be made sufficiently wide.

Figure 23:
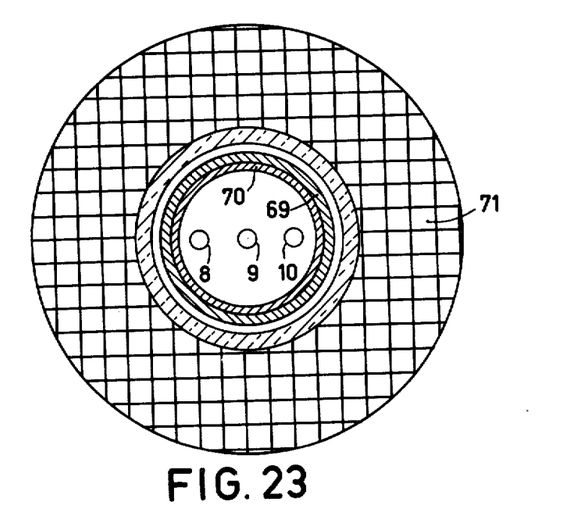

FIG. 23 is a sectional view of FIG. 22 along the line XXIII–XXIII in which the location of the ring 70 relative to the electron beams 8, 9 and 10 is clearly visible.

The automatic adjustment is carried out, for example, as follows:

(a) A vertical line is displayed on the display screen by means of beam 9.
(b) The position of the axis of the line relative to the centre of the photosensitive cell is determined by means of the detector 65 as shown in FIGS. 9 to 14
(c) The microprocessor determines what direct current I has to be suprimposed on the deflection current through the deflection coils by means of supply 72 in order to deflect the beam 9 in such manner that the vertical line is centered on the photosensitive cell
(d) The positions of the vertical lines displayed on the display screen by means of the electron beams 8 and 10 are measured by means of the detector
(e) The microprocessor stores the data fixing said positions in its memory
(f) A horizontal line is displayed on the display screen by means of beam 9
(g) The position of the axis of the line relative to the centre of the photosensitive cell is determined by means of the detector as is shown in FIGS. 9 to 14
(h) The microprocessor determines what direct current I has to be superimposed on the current through the deflection coils so as to deflect the beam 9 in such manner that the horizontal line is centred on the photosensitive cell (i) The positions of the horizontal lines displayed on the display screen by means of the electron beams 8 and 10 are measured by means of the detector (j) The microprocessor stores the data fixing said positions in its memory (k) From the data stored sub (e) and (j) the microprocessor computes the desired corrections and the currents through the magnetizing unit required therefor (l) The ring is magnetized (m) By means of the detector 65 the convergence is checked and the preceding procedures are repeated once or several times, if desired, if the convergence is not yet sufficient. After step (d) it is also possible to adjust the convergence unit already in such manner that the horizontal convergence is correct and after step (i) to adjust the convergence unit also for the vertical convergence.

Step (c) may be replaced by the following step c: The microprocessor determines what shift the synchronization pulse must obtain to shift the video signal in such manner that the vertical line is centred on the photosensitive cell and step (h) may be replaced by an analogous step.

It will be obvious that the device and the method may also be used in adjusting other known types of convergence units consisting of a number of permanent magnetic rings around the tube neck which together constitute an adjustable multipole unit.

In order to obtain an even more accurate result, one or more steps of the method may be repeated a number of times.

What is claimed is:

1. In a color display system having a color display tube for forming a color image from three controllable electron beams on a display screen, said beams having a convergence control for positioning said beams to converge at a desired position, a device for determining the proper convergence of said beams comprising:

a light detector including a photosensitive cell for receiving light from said color display tube having at least two separate photosensitive surface parts symmetrical about a center line of said detector, the photosensitivity of said surface parts increasing substantially as the distance from said center line, and optical elements for coupling a portion of a displayed image from said color display tube to said photosensitive surface parts; and means for measuring the difference in light intensity on each of said photosensitive parts whereby the convergence controls for said beams can be adjusted to establish a zero difference in light intensity from said detector surfaces to establish a convergence condition.

2. A device as claimed in claim 1, wherein said cell comprises four separate photosensitive surface parts which expand moving away from the center at which point all the surfaces meet.

3. A device as claimed in claim 2, wherein said cell is square and the diagonals of the square form the lines of separation between the four photosensitive surface parts.

4. A device as claimed in any of the claims 1, 2 or 3, wherein the optical elements of the detector comprise a color separation prism system device behind which three photosensitive cells are provided so that a part of the display screen is displayed on said three cells and the centers of the photosensitive cells have apparent coincidence at the screen surface.

5. A method of adjusting the static convergence of a color display tube having three selectable electron beams comprising:

displaying a first line on said color display tube screen from one of said electron beams in response to a video signal, said line extending in a first deflection direction;

locating a detector on a central part of said tube screen, said detector having two photosensitive surfaces with a photosensitivity which increases in a direction perpendicular to the longitudinal direction of the line from the center of the measuring cell;

adjusting the position of said line relative to said detector until said detector receives equal illumination on each of said surfaces whereby said line is determined to intersect the center of said photosensitive cell;

displaying second and third lines of said remaining electron beams on said color display tube screen, said second and third lines being parallel to said first; and adjusting the position of said second and third lines until said photosensitive surfaces receive an equal amount of light whereby said second and third lines are along the center of said photosensitive cell whereby said convergence is established in said first deflection direction.

6. A method of adjusting the static convergence of a color display tube which generates images on an image screen from three selectable electron beams excited by a video signal comprising:

displaying a first group of three lines from each of said electron beams by means of an applied video signal, said lines extending in one deflection direction over a central portion of said display screen, and thence a second group of three lines in a second deflection direction;

disposing a detector cell having first and second photosensitive surfaces over said central portion in said first and second directions, said surfaces having a photosensitivity increasing in a direction perpendicular to the longitudinal direction of the lines from a center of the detector cell;

determining the position of each of said lines in a group with respect to said cell by measuring the difference in light received on said surfaces from said lines, said position corresponding to the errors in static convergence; and adjusting the convergence of said groups of lines in each of said directions until each line of a group equally illuminates said detector cell surfaces.

7. A method as claimed in claim 6, wherein at least one of the lines is centered on one of the photosensitive cells during said position determining.

8. A method as claimed in claim 6 wherein the three lines are parallel and displayed simultaneously on the display screen, and the detector cell includes a color separation prism to display each line on a separate photosensitive surface, the centers of which apparently coincide on the display screen.

9. A method as claimed in claim 5 or 6 wherein one line is kept centered on the photosensitive cell by coupling back the signal of the photosensitive cell by superposition of a direct current on deflection currents controlling a respective beam or by a shift in the video signal.

10. The method of claims 5 or 6 wherein said video signal for generating a line is applied through a low pass filter for controlling the width of said line.

* * * * *